Aug. 6, 1974 K. ZENKNER 3,827,861
DEVICE FOR THERMAL AFTERBURNING OF EXHAUST AIR
Filed June 1, 1971 5 Sheets-Sheet 1

INVENTOR.
BY KURT ZENKNER
Jennings Bailey Jr.

INVENTOR.
KURT ZENKNER
BY Jennings Bailey, Jr.

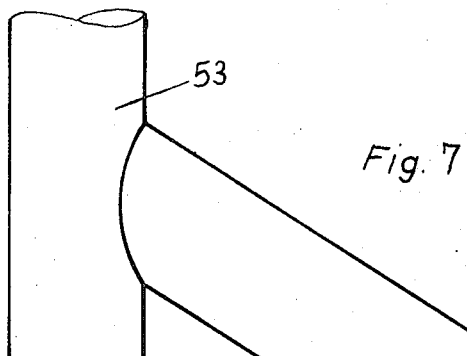
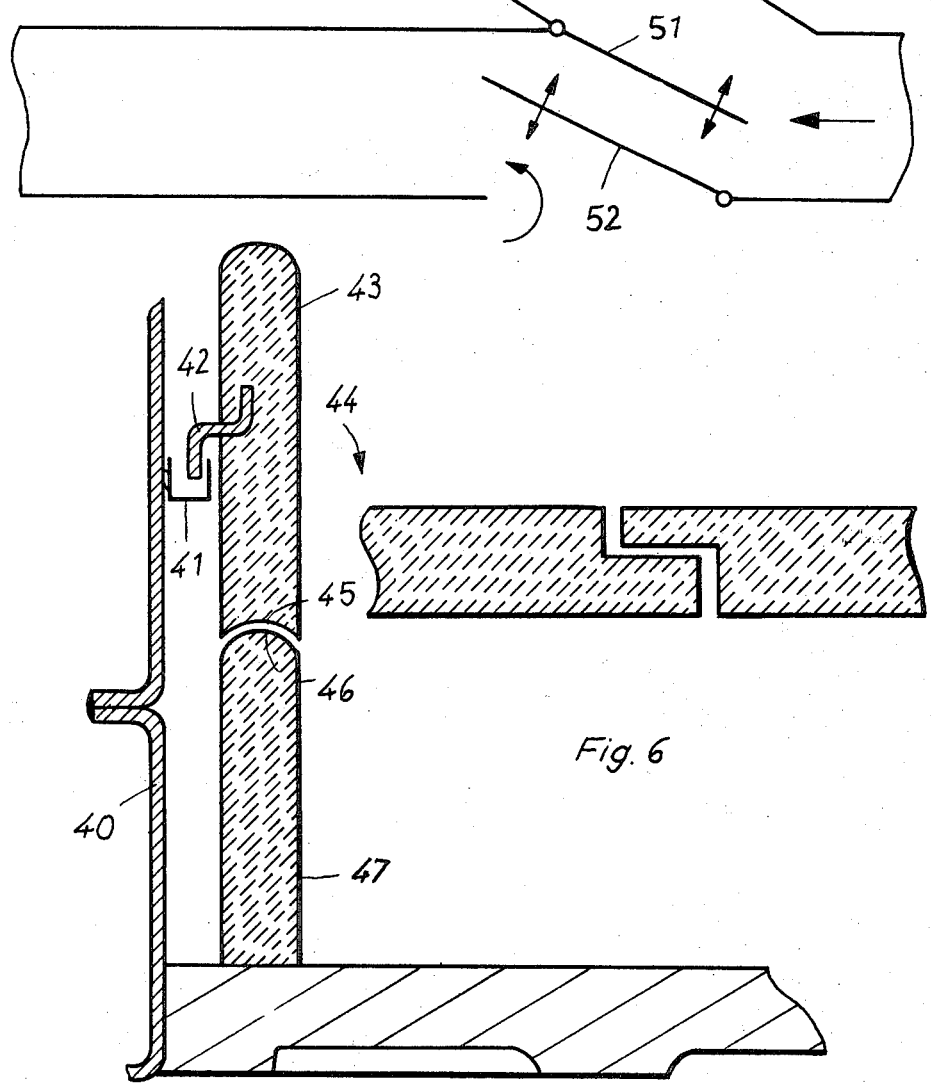

United States Patent Office 3,827,861
Patented Aug. 6, 1974

3,827,861
DEVICE FOR THERMAL AFTERBURNING OF EXHAUST AIR
Kurt Zenkner, Hertzstr. 12, Ettlingen, Germany
Filed June 1, 1971, Ser. No. 148,710
Claims priority, application Germany, May 29, 1970,
P 20 26 237.7
Int. Cl. F23g 7/06
U.S. Cl. 23—277 C           8 Claims

ABSTRACT OF THE DISCLOSURE

For the thermal afterburning of exhaust air from an industrial plant, such as a drying chamber, which air contains oxidizable foreign bodies, fluid particles or gases, the exhaust air is passed through a pair of heat exchangers in series, then through a burner while supplying air to the burner, and the resultant high combustion gases are led back outside the burning zone in a direction opposite to the original flow direction through the heat exchangers in heat exchange relation with the incoming exhaust air.

BACKGROUND OF THE INVENTION

1. Field of the Invention

The present invention relates to a process for thermal afterburning of exhaust air from an industrial plant, such as drying chambers and the like, containing oxidizable foreign bodies, fluid particles or gas. The invention further relates to a device for carrying out this process.

SUMMARY OF THE INVENTION

The aim of the invention is to achieve total mixing of the components to be burned in the exhaust air with oxygen during this thermal afterburning, to bring this mixture to ignition temperature, to enable the components for burning to remain in combination with their reaction counterpart, oxygen, long enough to achieve total combustion, and to keep the energy consumption of the combustion plant as small as possible.

According to the invention, this aim is achieved by a process in which the exhaust air is passed through one or more heat exchangers disposed in series, the temperature of the exhaust air rising, and in which it is passed through a burner operating with excess air and/or introduced, air, the foreign bodies and fluid or gas particles being released and burned, in which the resultant hot combustion gases, after leaving the combustion chamber, are passed back out with the combustion products contrary to the original flow direction, and are selectively passed through one of the heat exchangers preceding the combustion chamber, or through both heat exchangers, in an opposite direction, so that, giving off their heat to the fresh air flowing into the heat exchanger or exchangers, they cool down to such an extent that their outlet temperature after passing through the heat exchangers is only slightly above the temperatures of the exhaust air entering the heat exchangers, the exhaust air then being released. In order to achieve total combustion of the components accompanying the exhaust air, according to a further feature of the process according to the invention, parts of the combustion gases ensuing from combustion are again sucked into the combustion centre, after the combustion process, preferably by causing the flame emerging from the burner, before entering the main combustion chamber, suck in part of the exhaust gases which have already passed through the main combustion chamber, after the fashion of an injector, and introduce them into the main combustion chamber again.

In order to achieve the desired aim, a device for carrying out this process according to the invention is also proposed, in which several heat exchangers are arranged in series, in a casing downstream from the inlet opening for the exhaust air, the exhaust air passing through them, and the combustion gasses flowing through them in the opposite direction, followed by a burner comprising for example a preliminary combustion chamber a main burner and a main combustion chamber, the main combustion chamber being open at the ends, seen in the flow direction of the exhaust air to be burned, and from which the emerging combustion gases are passed back into the heat exchangers, through which they flow in the opposite direction to the flow of exhaust air.

The purpose of thermal afterburning is on the one hand to make available to the maximum number of exhaust air particles the reaction counterpart, oxygen, and on the other hand to make available the necessary ignition energy. As a rule, industrial exhaust air, as regards the particles in it which are to be burned, contains a considerable proportion of excess air, so that, as a result of turbulent exchange processes, a uniform oxygen distribution has already taken place in the actual drying plant, and the particles to be treated are already surrounded by reaction counterparts. On the other hand, it is more difficult to supply this mixture with the necessary energy for combustion, and to afford it the reaction time for combustion. The quality of the burning depends on the relative degree of skill used in influencing these processes. It is just at this point that the invention brings considerable advantages to bear. A gas additionally introduced by a burner into the flow of exhaust air is preferably used as an energy-carrier. The gas concentrations ignited at the burner are distributed in the airflow by intensive turbulent exchange processes. The energy thus released is passed on to the actual reaction counterparts by conduction, convection and radiation. Depending on the concentration of combustible components in the flow of exhaust air, and on their energy development, an auxiliary gas flow is often only necessary for initial ignition. The further course of combustion is a chain reaction resulting from this igniton.

BRIEF DESCRIPTION OF THE DRAWINGS

Further features, particularly with regard to the design of the combustion chamber and casing walls, and to the cooling, will become apparent from the following description with reference to the drawing. The particular advantages of the invention and the method of operation of the device according to the invention are seen in the description. The drawings show the following:

FIGS. 6 and 7: two further details, in partial section and on an enlarged scale, of modifications of the arrangement according to the invention.

DESCRIPTION OF THE PREFERRED EMBODIMENTS

Figure 1:
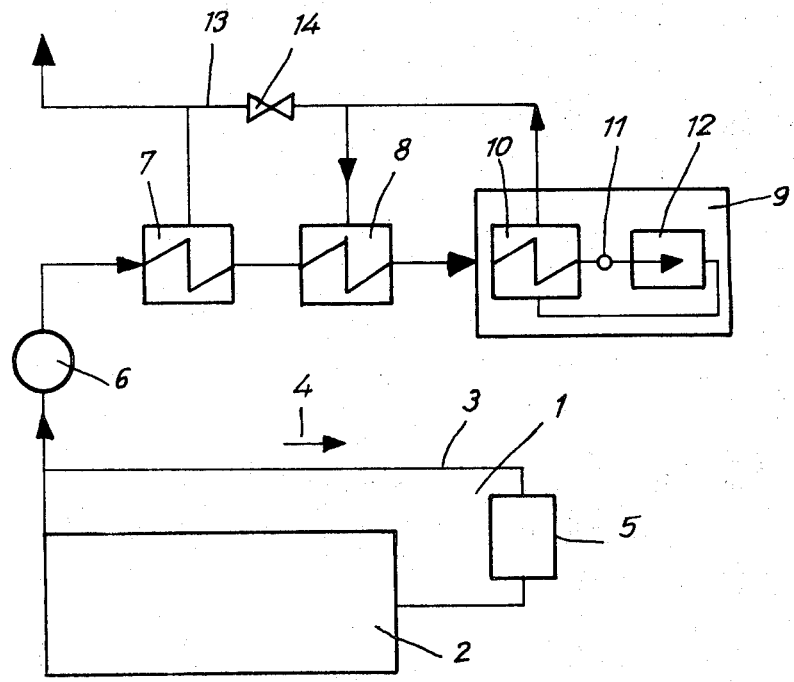
FIG. 1: a diagram of the guidance of the exhaust air and combustion gas, in a plant according to the invention.
Figure 2:
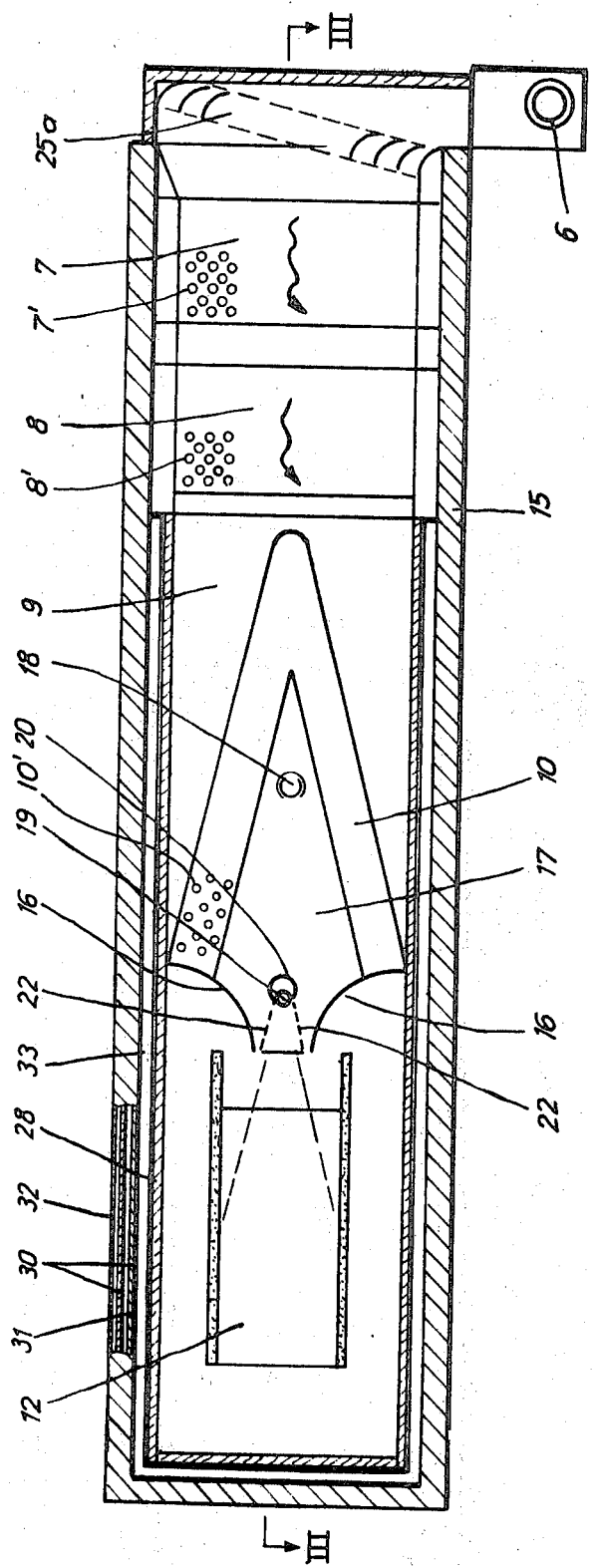
FIG. 2: a top plan view in cross-section on the line II–II of FIG. 3.
Figure 3:
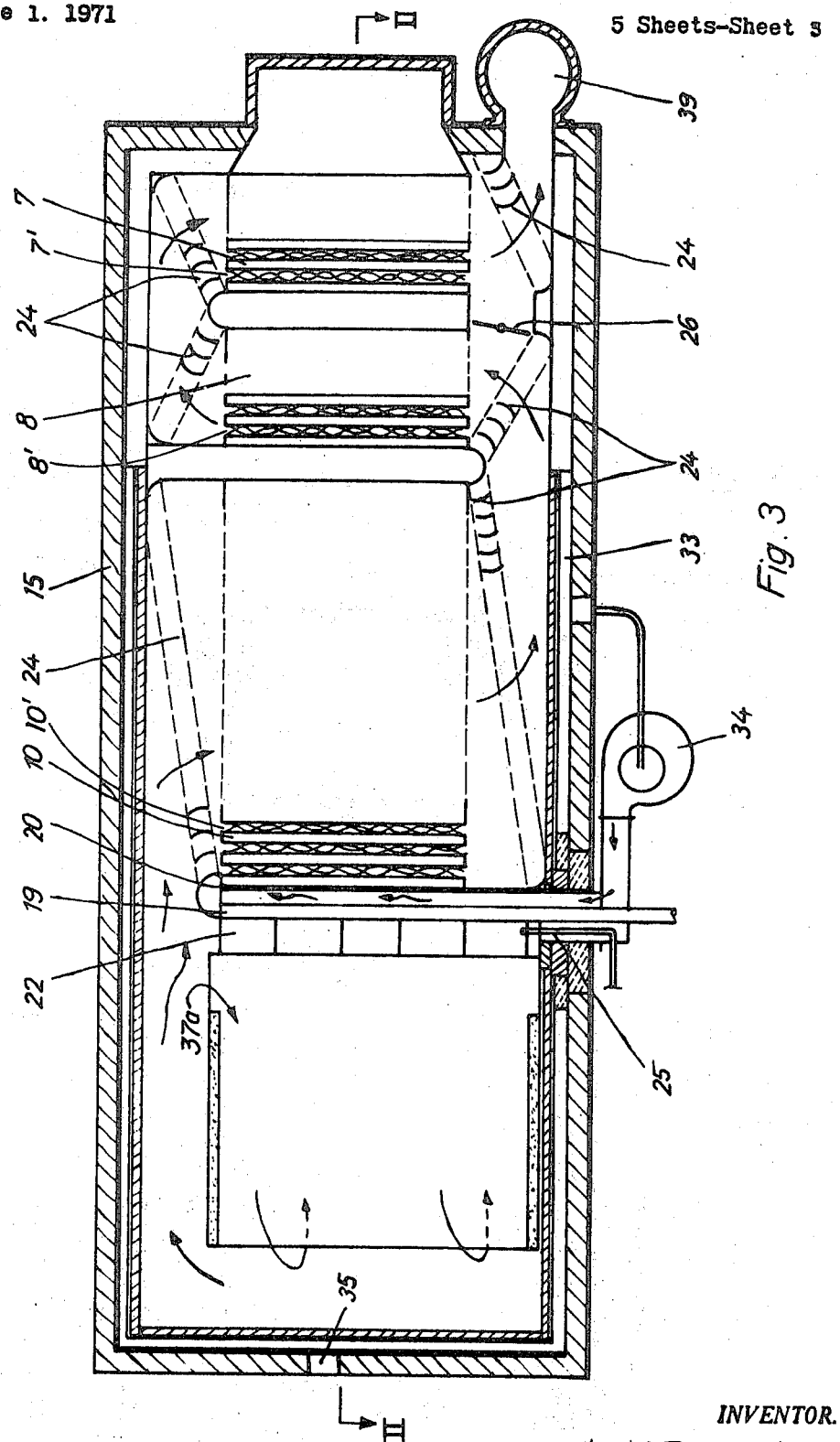
FIG. 3: a cross-section on the line III–III of FIG. 2.

In FIG. 1, 1 denotes in general an industrial plant consisting of a drying chamber 2 and a channel 3 for circulating the air necessary for drying. Such a plant can for example consist of a varnish-drying oven. The air flows through channel 3 in the direction of arrow 4, and is heated by a heating device 5. Part of the circulated air passes out of drying chamber 2 or channel 3 as exhaust air. After leaving the industrial plant 1, the pressure of the exhaust air is preferably raised in a pressurising unit 6, such as a blower, preferably a crossflow blower. The exhaust air then passes into heat exchanger 7 and thence into heat exchanger 8, its temperature rising. The heated exhaust air then passes into combustion chamber 9, then passing through a further heat exchanger 10, whose special function will be described in detail later. Thereupon the exhaust air passes through burner 11, which operates with excess air, or in whose vicinity further air is introduced. The ignited exhaust air burns in main combustion chamber 12. The hot combustion gases arising during combustion are now passed back, contrary to the previous flow direction, into combustion chamber 9, and flow in series through the tubes 10', 8' and 7' of heat exchangers 10, 8 and 7, in which they give off their heat to the entering exhaust air. After the combustion gases emerge from the last heat exchanger, in the example in FIG. 1 out of heat exchanger 7, the combustion gases have to a great extent cooled down, and may be released into the outside atmosphere. The outlet temperature of the combustion gases is only slightly above the inlet temperature of the exhaust air. In order to achieve total combustion of the components accompanying the exhaust air, the combustion gases leaving main combustion chamber 12 are at least partly sucked back into the main combustion chamber 12. Moreover, in order to avoid overheating the entering exhaust air, provision is made for the emerging combustion gases to be releasable directly into the atmosphere, by-passing heat exchangers 7 and 8. This is indicated in FIG. 1 by a by-pass pipe 13 arranged between heat-exchangers 7 and 8 and parallel thereto, and by a closure shutter 14. The arrangement can for example also be such that the combustion gases, after leaving the combustion chamber, and before finally flowing out, are passed either through only heat exchanger 8 or through heat exchangers 7 and 8. Further features of the process according to the invention are now seen in the following description of the device according to the invention. FIGS. 2 and 3 show plan and elevation views respectively of the device, whose components, described in more detail in the following, are surrounded by a casing 15. The heat exchangers 7 and 8 are followed by a combustion chamber 9. This combustion chamber 9 contains a further heat exchanger 10 which is V-shaped in cross-section (cf. FIG. 2), and whose opening facing the main combustion chamber 12 is fitted with guide-plates 16 arranged to converge towards main combustion chamber 12, so that a jet-like opening tapering towards combustion chamber 12 results. If necessary, heat exchanger 10 can also be dispensed with. In this case, as will be described in more detail, the hot combustion gases flow through the tubes of the heat exchangers while the entering exhaust air flows past the surface of the tubes. The V-shaped heat exchanger 10 defines a preliminary combustion chamber 17. In this chamber 17 there is a pilot burner 18 for igniting the easily-flammable components of the entering exhaust air. Further, within the preliminary combustion chamber 17, in the vicinity of the opening formed by guide-plates 16, there is arranged a main burner 19, surrounded by a tube 20.

Figure 4:
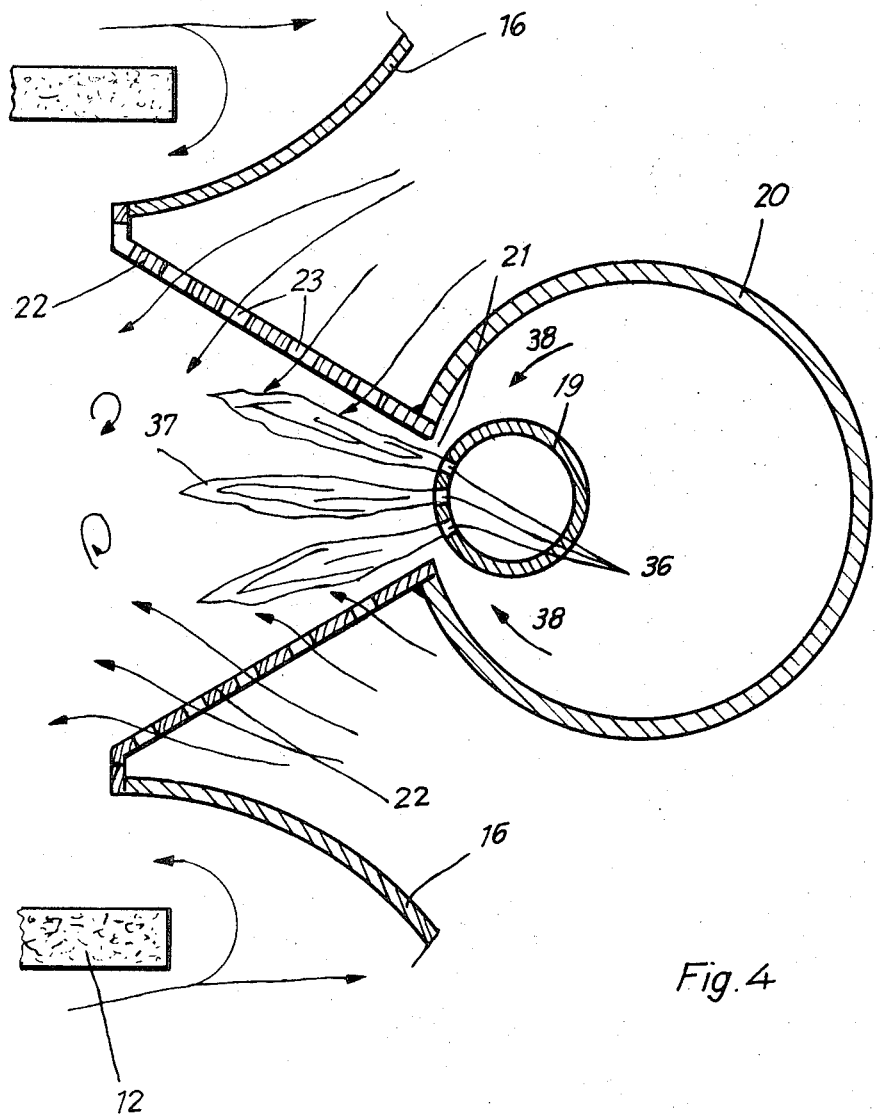
FIG. 4: a cross-section on an enlarged scale of the burner chamber of FIGS. 2 and 3.

FIG. 4 shows an enlarged cross-section through main burner 19. Tube 20, through which air flows, surrounds main burner 19 nonconcentrically, i.e. the longitudinal axis of main burner 19 is arranged at a distance from the axis of tube 20. The air flowing out of tube 20 is intended on the one hand to cool the jacket of main burner 19, and on the other hand to provide the necessary excess air in the ensuing combustion of exhaust air. Tube 20 has a slot 21 extending parallel to the axis, allowing the flames from main burner 19 to pass through. In the edge regions of slot 21 further guide-plates 22 are arranged, running divergently to the main combustion chamber 12, and having apertures 23. Their free edges are preferably connected with the free edges of the guide-plates 16. The main burner 19 (FIG. 3), likewise tubular in form, passes through the wall of casing 15, and opens into supply-pipes for the combustion gas which are not shown here. Moreover, connections (not shown) for air-supply to tube 20, and an igniter 25, are provided. The characteristic feature of the new after-burning plant consists in the injector-like arrangement of a surface burner, and in the guide- or flow-walls associated with this injector. In this case the exhaust air, pre-heated, is blown in through the guide-surfaces of the surface burner and through a slot, round the burner into the combustion chamber. During this passage, the exhaust air flow breaks up into a large number of turbulent separate streams, and mixes intensively with the emerging and simultaneously burning gas. The intensive mixing effect of these turbulent flames causes hot combustion gases to be sucked into the combustion chamber. In fact the combustion gases emerging from the combustion chamber are sucked, injector fashion, in the direction of arrows 37a, in the flame or in the burning gases 37 emerging from the burner. The mass of flame likewise increases as the length of travel increases. To this increase in mass, for reasons of continuity, there corresponds the mass of the return flow out with the guide- or flow-walls. The mass of the return flow can be a multiple of the initial mass of the flame. With the magnitude of the return flow, the delay time of the reaction counterparts in the combustion chamber is increased. Moreover, the particles in the return flow repeatedly pass through the flame zone. The delay-time spectrum of this combustion chamber lacks the so-called initial peak. The result is a shift in throughput performance to higher delay times. This characterises the long-duration spectrum. The return-flow guide- or flow-walls have the purpose of compensating to a large extent for the low radiation property of the flame, determined by the usually high air excess and the type of gas. The intensity of reaction is influenced by the turbulent exchange movement and by the combustion chamber temperature. The combustion chamber is designed for a median combustion chamber temperature of 800° C. In arrangements with several burners, return flow shafts must be provided between the individual burners, so that the combustion chamber medium may be supplied laterally.

Combustion chamber 9, as FIGS. 2 and 3 show, is roughly box-shaped. The main combustion chamber 12, disposed in combustion chamber 9, is also substantially box-shaped. Main combustion chamber 12 is preferably made of magnesium oxide, a material which, when heated, gives off a large part of its heat by radiation.

Before and after each of the heat exchangers 7, 8 and 10 there are provided guide-vanes 24 for the combustion gases and, following the inlet opening for exhaust air into casing 15, guide-vanes 25a for the exhaust air. At casing 15, in the region of the exhaust air opening, a pressurising unit 6 for increasing the pressure of the exhaust air flowing into casing 15 is flanged on. Finally, one or more closure shutters 26 (cf. FIG. 3) may be arranged between heat exchangers 7, 8 or 10.

Figure 5:
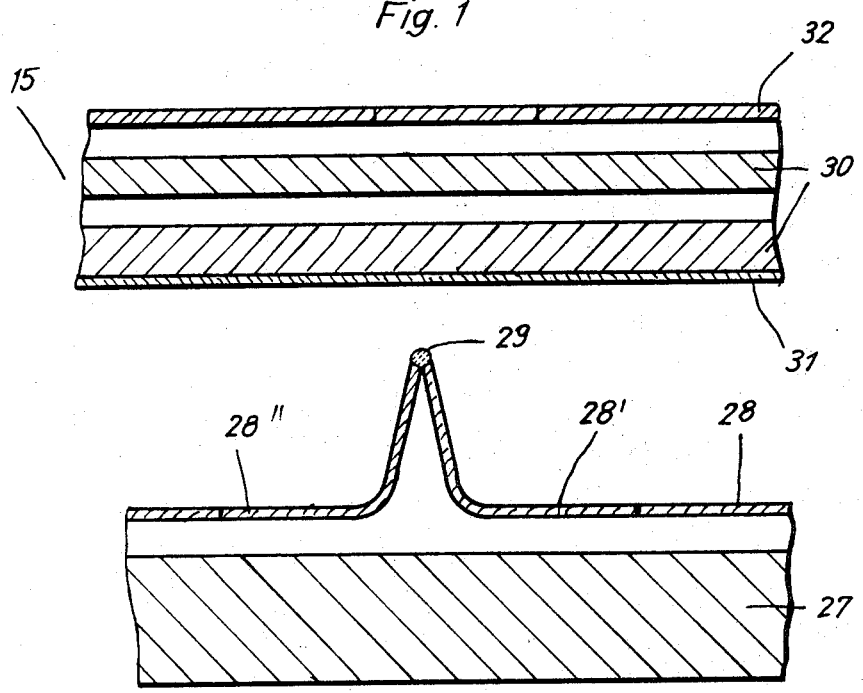
FIG. 5: a partial detail of the construction of the combustion chamber and the casing walls of FIG. 1, on an enlarged scale.

The walls of combustion chamber 9 preferably consist of fireclay or of a heat-resistant material such as calcium silicate, surrounded by a sheet metal skin 28. The walls of casing 15 consist of several layers 30 of an intensely heat-insulating and heat-resistant material, e.g. a web of rock wool, and have on the inside an intensely reflective aluminium layer of foil 31 and, on the outside, a sheet metal jacketing 32. FIG. 5 is an enlarged view of a partial inset of the casing and combustion chamber walls. The calcium silicate wall of combustion chamber 9 is denoted by 27, and the sheet metal skin by 28. It should be noted that the metal skin 28 is assembled from separate segments (28', 28") whose edges are turned outwards and welded (weld seam 29). This has the advantage that thermal length variations caused by the intense heating are elastically and flexibly absorbed by the turned-out edges, so that the heat tension in combustion chamber 9 is avoided; in addition, welded seam 29 is kept as far as possible from the heat zone. As further seen in FIG. 5, the heat-insulating layers 30 of rock wool are spaced apart. To be noted in particular however is the particularly large space between wall 27, 28 of combustion chamber 9 and wall 30, 31 of casing 15, giving rise to an air-filled space 33. In order to achieve particularly efficient cooling of the outer surface of the casing wall, the air is sucked out of space 33 and, as shown diagrammatically in FIG. 3, compressed by a blower 34 into the tube 20 surrounding main burner 19. An opening 35 in the casing wall ensures that cool air from the atmosphere can flow back in. The high insulating properties of calcium silicate and of the air-space considerably reduce the temperature stress on the sheet metal. The large air-space between the sheet metal and the outer insulation permits varying expansion of the combustion chamber and outer casing. Thus undesirable material tensions and fatigue symptoms are avoided. The air-space is defined on the outer insulation side by a mirrored layer which, by means of an extremely low radiation number, eliminates the amount of radiation during heat-transfer. The adjacent high-performance insulation is formed by alternating layers of anti-radiation and convective insulating material. The air in the outermost air layer may be evacuated, and the temperature of the outer skin may in this way be kept extremely low.

According to FIG. 6, the plates serving for insulation, made of ceramic material, of which the walls of the combustion chamber consist, may be arranged to be movable relative to one another. In FIG. 6, 40 is the plate forming the combustion chamber wall, on whose inner side there is attached a U-shaped fixture strip 41, into which there engages a Z-shaped fixture bracket 42, which is cast into the ceramic plate 43. Parts 41 and 42 do not serve to suspend the plates; their purpose is merely to prevent plates 43 from tilting inwards in the direction of arrow 44. Plate 43 sits with a concave surface 45 on a convex surface 46 of the underlying plate 47, the lowest plate sitting on the base, which also consists of ceramic plates, so that heat-expansion may be absorbed by the all-round mobility. The plates have a dovetailed overlap laterally or longitudinally, as shown next to FIG. 6, so that on the one hand there is some play, and on the other, radiation cannot pass directly through.

There follows a brief description of the method of operation of the device according to the invention, thereby also clarifying the process according to the invention.

The exhaust air blown from drying chamber 2 is increased in pressure by pressurising unit 6, such as a cross-flow blower, and flows into the casing 15 of the device according to the invention. Here it is deflected by guide-vanes 25a and flows through heat exchangers 7, 8, flowing past the outer surfaces of the tube group forming heat exchangers 7 and 8 (undulating arrows in FIG. 2). After flowing through heat exchanger 8, the exhaust air passes into combustion chamber 9 and flows through heat exchanger 10 arranged at this point. In heat exchangers 7 and 8 the exhaust air temperature was raised to a point below the ignition temperature of the foreign components accompanying the exhaust air. On passing through heat exchanger 10 the exhaust air is further heated, and reaches a temperature above that of the said foreign components. At this point there can for example be a temperature increase of e.g. 450° C. to e.g. 600° C. The easily-flammable components are now already burning in the preliminary combustion chamber 17. In order to prevent the flame zone from blowing back against the flow direction of the exhaust air towards the heat exchanger 8, the number and size of the tubes forming the heat exchanger 10, and thus the free throughflow cross-section through heat exchanger 10 are of such dimensions that the flow speed of the exhaust air according to the continuity equation is equal to, but preferably greater than the ignition speed of the components accompanying the exhaust air. The pilot burner 18 arranged in preliminary combustion chamber 17 ensures uniform combustion in preliminary combustion chamber 17, so that no damaging pulse formations occur. The exhaust air with the partly-burning foreign components now flows past main burner 19 into main combustion chamber 12. Determined by the jet-like tapering opening in preliminary combustion chamber 17 formed by guide-plates 16, the speed of the exhaust air increases greatly. Moreover, the exhaust air, flowing through the apertures 23 in guide-plates 22, is intensely mixed. Intense turbulence occurs, so that the components accompanying the exhaust air are supplied both with sufficient oxygen and with enough ignition energy from main burner 19. The processes in the main burner zone are shown on an enlarged scale in FIG. 4. When the exhaust air passes through the openings 23 in guide-plates 22, turbulence areas form, the exhaust air mixing internally with the flames 37 issuing from the openings 36 in main burner 19, and with the air (arrow (38)) flowing back from tube 20. The actual combustion of the exhaust air components now takes place in the main combustion chamber 12. The hot gases ensuing from combustion leave main combustion chamber 12 at the opening lying opposite burner 19, and now flow back outside main combustion chamber 12 contrary to the previous flow direction. Part of the returning combustion gases is again sucked into the main combustion 12 in the region of the main burner. The flame zone spreading out from the main burner 19, because of the high speed of the burning exhaust air, acts like an injector, which draws parts of the returning combustion gases with it. After the combustion process, the combustion gases are introduced past guide-vanes 24 into the tubes of heat exchangers 10, 8 and 7. Cooling down, they give off their heat to the exhaust air entering and flowing through exchangers 7, 8 and 10. Then the combustion gases which contain no further unburned components pass out of the device according to the invention through channel 39. If the temperature of the exhaust air should exceed a certain value, the combustion gases may also be passed directly into the channel 39. For this purpose a closure flap 26 is provided, which is opened as necessary.

Tubular exchangers with turbulence elements are preferably used as heat exchangers.

FIG. 7 shows how more or less fresh air, for example as rinsing air, can be let into the system by moving flaps 51, 52, the plant being preferably operated with fresh air when starting, and the exhaust air switched in only when the plant is hot. By moving flap 51, the exhaust air can be passed either into the chimney 53 or into the system, a certain degree of dosing being possible.

By means of the process according to the invention, and of the device for carrying out this process, it is thus possible to achieve total combustion of the exhaust air from an industrial plant. Only a little energy need be supplied, and a considerable saving is obtained in comparison to known devices.

I claim:

1. A device for thermal afterburning of exhaust air, comprising a casing, a plurality of heat exchangers (7 and 8), mounted in series in said casing (15), said casing having an inlet opening for the exhaust air, means for guiding the exhaust air from said inlet opening through said heat exchangers, a combustion chamber (9) downstream from said heat exchangers which includes a preliminary combustion chamber (17), a main burner (19) and a main combustion chamber (12) having open inlet and outlet ends, seen in the flow direction of the exhaust air to be burned, means to conduct a part of the emerging combustion gases from the outlet end of the main combustion chamber back to the inlet end thereof, and means for conducting the remainder of the emerging combustion gases from the outlet end of the main combustion chamber back into the heat exchangers (7, 8) through which they flow in the opposite direction of the exhaust air flowing in, the main burner (19) extending over the whole width of the main combustion chamber (12), a tube (20)

through which air passes surrounding the main burner, said tube having a slot (21) parallel to the tube axis and facing the main combustion chamber (12), said slot allowing the flames (37) to pass out of the main burner (19) and the air out of the tube (20), and guide-plates (22) connected to the tube at the edges of the slot (21) which diverge towards the main combustion chamber (12) and which have apertures (23) therein through which the incoming exhaust air flows from the heat exchangers.

2. A device as in claim 1, comprising guide-vanes (24, 25a) arranged in the casing (15), at least downstream from the inlet opening for the exhaust air, said guide-vanes producing deflection of the flow through about 90°.

3. A device as in claim 1, in which the main combustion chamber (12) consists of magnesium oxide, whereas the walls of the combustion chamber (9) are of fireclay or calcium silicate, a sheet metal skin (28) arranged at a distance therefrom outside the combustion chamber, said skin comprising a plurality of segments (28', 28"), welded together (weld seam 29), the said segments (28', 28") of the sheet metal skin (28) being bent over in the region of the joining-point at approximately right angles, in such a way that the edges of the segments (28', 28") and the weld seam (29) at this part point away from the combustion chamber (9).

4. A device as in claim 1, in which the walls of casing (15) comprise a plurality of layers (30) of a heat-resistant, insulating material, each layer being spaced apart, an inner skin (31) of material reflecting back the heat radiation and an outer sheet metal jacketing (32).

5. A device as in claim 1, in which between the walls (27, 28) of combustion chamber (9), and the walls (20, 31, 32) of the casing (15) there is provided a free space (33) which communicates with the atmosphere through an opening (35) in casing (15), there being between the free space (33) and tube (20) surrounding the main burner (19) a connector channel with which is associated a blower (34) sucking the air out of the free space (33) and compressing it into the tube (20) surrounding the main burner (19).

6. A device as in claim 1, in which a bypass flap (26) is arranged in front of the heat exchanger (10).

7. A device as in claim 1, in which the walls of the combustion chamber are of sheet metal and the plates forming the walls of the combustion chamber, made of ceramic material, are freely suspended on one another, the upper plate in each case sitting with a concave surface on a convex surface of the plate underneath, while the lowest plates sit on the base, which is also made of ceramic material, and, seen longitudinally, the plates overlap one another in a Z-shape, and the plates are mounted on the sheet metal combustion chamber walls by means of U-shaped fixture strips, with the opening of the U upwards, into which Z-shaped fixture brackets engage, their other end being imbedded in the associated ceramic plate.

8. A device as in claim 1, in which the supply pipe for the exhaust air to be burned includes a flap which is movable, and whose movement alters the proportion of fresh air admitted, while the feed-pipe to the chimney includes a further movable flap, whose movement alters the proportion of fresh air or exhaust air passing into the chimney or into the plant, whereby the supply of fresh air may be closed when the supply to the chimney is closed.

References Cited
UNITED STATES PATENTS

| | | | |
|---|---|---|---|
| 2,985,255 | 5/1961 | Clark | 23—277 C |
| 3,251,656 | 5/1966 | Edwards | 23—277 C |
| 3,353,919 | 11/1967 | Stockman | 23—277 C |
| 3,090,675 | 5/1963 | Ruff et al. | 23—277 C |
| 3,311,456 | 3/1967 | Denny et al. | 23—277 C |

EARL C. THOMAS, Primary Examiner

U.S. Cl. X.R.

423—210